United States Patent
Ardalan

(10) Patent No.: US 10,361,786 B1
(45) Date of Patent: Jul. 23, 2019

(54) PHASE OPTIMIZATION TECHNIQUE IN HIGH-SPEED SIMULTANEOUS BI-DIRECTIONAL LINKS

(71) Applicant: Radin Global, San Jose, CA (US)

(72) Inventor: Shahab Ardalan, San Jose, CA (US)

( * ) Notice: Subject to any disclaimer, the term of this patent is extended or adjusted under 35 U.S.C. 154(b) by 0 days.

(21) Appl. No.: 15/286,538

(22) Filed: Oct. 5, 2016

Related U.S. Application Data

(60) Provisional application No. 62/238,109, filed on Oct. 6, 2015.

(51) Int. Cl.
*H04B 10/40* (2013.01)
*H04L 7/00* (2006.01)

(52) U.S. Cl.
CPC .......... *H04B 10/40* (2013.01); *H04L 7/0075* (2013.01)

(58) Field of Classification Search
CPC ....... H04B 10/40; H04B 10/43; G02B 6/4246
See application file for complete search history.

(56) References Cited

U.S. PATENT DOCUMENTS

| 2004/0120391 A1* | 6/2004 | Lin | H04L 5/1423 375/219 |
| 2006/0133599 A1* | 6/2006 | Pagnanelli | H04B 1/525 379/406.08 |

* cited by examiner

*Primary Examiner* — Mina M Shalaby
(74) *Attorney, Agent, or Firm* — Richard E. Ballard

(57) ABSTRACT

A bidirectional transceiver includes a transmitter and a receiver that respectively transmits a local signal to and receives remote signal from a common bidirectional communication channel, thus the bidirectional channel signal is the superimposition of the local and remote signals. The bidirectional transceiver also includes a transmit canceller that substantially removes the local transmitted signal from the superimposed signals on the bidirectional channel before the local receiver. The remote signal is transmitted by a remote transceiver over the bidirectional channel. A sampling phase is set, based on timing information in the received remote signal, and the received signal is sampled. Timing relation of transitions in the local transmit signal relative to the receiver sampling phase is set such that transmit signal cancellation is optimum at receiver sampling phase, by changing the delay applied to the local transmit signal. To keep the timing relation of the local transmit signal relative to the remote transceiver, a second delay is applied to the local transmit signal before transmission into the bidirectional channel that provides a delay substantially same as the first delay but opposite in direction.

16 Claims, 6 Drawing Sheets

PHASE OPTIMIZATION TECHNIQUE IN HIGH-SPEED SIMULTANEOUS BI-DIRECTIONAL LINKS

CROSS-REFERENCE TO RELATED APPLICATIONS

This application claims a benefit of priority to U.S. Provisional Patent Application No. 62/238,109, filed on Oct. 6, 2015 (entitled "A Receive Sampling Phase Optimization Technique in Multi-Gbps Bi-Directional Serial Links"), the entire content of which is incorporated by reference.

TECHNICAL FIELD

The present disclosure relates generally to the field of communication, and specifically to high-speed simultaneous bi-directional serial links

BACKGROUND

One technique for simultaneous bi-directional data transmission is separate communication channels. This can be inefficient, though, as available channel capacity in the opposite direction can be unused. Such inefficiency can be costly, particularly where bandwidth is limited (e.g., wireless communication), the transmission distance is long (e.g., long-haul fiber optic communications), or the number of available channels is limited or costly (e.g., high-throughput integrated circuit packages and printed circuit boards (PCBs).

Another technique for simultaneous bi-directional communication is to assign different carrier frequencies for signals traveling in opposite directions. The near-side transmit signal can be modulated by one carrier frequency, and the received signal from the far-side is modulated by another carrier frequency. The difference between the carrier frequencies can be enough so the transmit and receive spectrums do not overlap and can be properly filtered out at each receiver. This method can be inefficient because it splits the effective available channel bandwidth between the two directions, which can be disadvantageous in high-throughput applications. Additionally, the required frequency separation margin, for proper channel isolation and filtering of signals in each band, can lead to wasteful use of the channel bandwidth. For example, operation of a simultaneous bi-directional communication using separate frequency channels in each direction can waste half or more of the total available channel bandwidth.

Another technique for simultaneous bi-directional transmission operates transceivers at opposite ends of a channel medium, concurrently transmitting signals to one another other, through the channel medium, such that the receiver of each transceiver receives a superposition of the signal sent by the opposite end transceiver, and the signal transmitted by its own transmitter. One technique for removing the signal transmitted by its own transmitter is to generate, locally, a replica of that transmitted signal and then subtract the replica from the superposition, then sample the residual. If the replica is exact, the only signal remaining in the residual is the signal from the opposite end transceiver. However, there can be problems with this technique, particularly at higher communication bandwidths. Certain of the problems can arise from fast slew rate transitions of the transceiver's own transmitted signal, as these can introduce noise, especially if proximal in time to a trigger or sampling phase of the receiver's sampler. However, conventional techniques cannot simply shift the sampling phase to move it away from transitions in the locally transmitted signal, because the sampling phase is optimized in relation to the symbol period in the received signal. Merely shifting the sampling phase could result in sub-optimal sampling, which in turn could produce unacceptably high error rates.

There is a need therefore for a practical, stable performance simultaneous bi-directional transceiver system in which opposite end transceivers can each cancel receipt of their own transmissions, while maintaining in the each of the transceivers an optimal sampling of the signal received from the other.

DETAILED DESCRIPTION OF THE INVENTION

Figure 1:
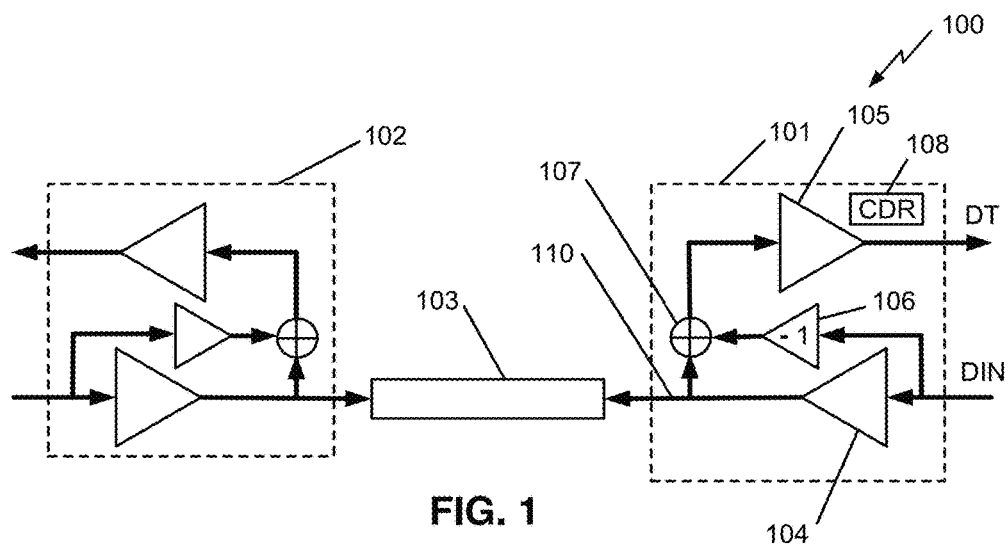
FIG. 1 Illustrates one example bidirectional communication link over a single physical channel.

FIG. 1 illustrates an example simultaneous bi-directional transceiver system capable of providing recovery, at each of the bi-directional transceivers 101 and 102, of the signal transmitted through the physical channel 103 by the other. Transceiver 101 includes transmitter 104, receiver 105, transmit replica unit 106, signal adder 107, and a clock and data recovery (CDR) unit 108. Transceiver 102 is similarly configured, and therefore labeling is omitted. Operation will be described for the transceiver 101, and will be understood to apply in like manner to transceiver 102. In operation, the line signal at the bi-directional transceiver 101 is a superposition of the transmit signal output by its own transmitter 104 and a signal received, after travelling through the channel 103, from the transmitter of transceiver 102. The transceiver 101 removes its own transmit signal from the superposition by configuring the transmit replica unit 106 to generate substantially the same signal as transmitter 104 but with opposite polarity, then using signal adder 107 to add the opposite polarity replica signal and the channel signal and outputs the sum as a residual to the receiver 105. Operations of the CDR unit 108 will be described in greater detail in reference to FIGS. 2A and 2B. Referring to FIG. 1, assuming the transmit replica unit 106 generates an accurate replica (with opposite polarity), the residual will include none of the signal transmitted by transmitter 104. However, as the communication signal bandwidth increases, certain phenomena can arise, including significant attenuation by the physical channel 103 of the signal from the opposite end transceiver, that can complicate, or degrade, or both, the above-described transmit signal cancellation.

Figure 2A:
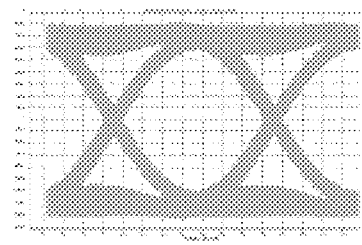
FIG. 2A Illustrates a transmitter eye diagram for a non-return to zero (NRZ) data pattern before the physical channel.
Figure 2B:
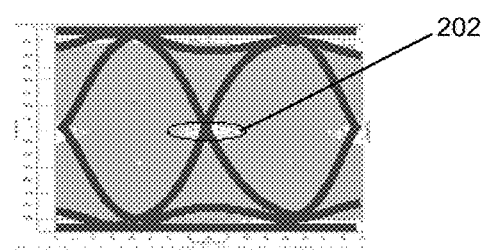
FIG. 2B Illustrates an attenuated received eye diagram after a low-pass channel, with the strong local transmit signal transitioning at middle of received eye opening.

Referring to FIGS. 2A and 2B, information represented by the figures will be described referring to FIG. 1, and will assign transceiver 101 as a "local" transceiver and transceiver 102 as a "remote" transceiver. Referring to FIG. 2A, illustrated is a transmit signal eye diagram at the remote transceiver (e.g., at transceiver 102) before the channel 103. FIG. 2B shows the attenuated received signal, as received at he local transceiver (e.g., transceiver 101) after passing through the channel 103. At the local transceiver, the CDR unit 108 determines optimum sampling phase. A conventional CDR unit extracts the phase and frequency information from the received signal and generates a local clock that is frequency locked to the received signal with a sampling phase for highest received SNR. In a high-speed simultaneous bidirectional link, the received signal eye opening is significantly smaller compared to the local transmit amplitude on the same channel. Thus, small residual errors in cancellation of the relatively large transmit signal leads to large degradations of the received signal. Large transmit cancellation errors specifically occur during the fast signal transitions, as any minor timing error such as phase error or jitter translates to large amplitude errors. FIG. 2B shows an example of a highly attenuated received signal with a large local transmit signal transition at middle of the received eye opening. This condition represents a worst case scenario for this problem, because transmit maximum slew rate occurs at the same phase location as CDR unit chooses as optimum receive sampling point. Therefore a conventional CDR functionality cannot provide an optimum sampling condition for receive SNR.

Figure 2C:
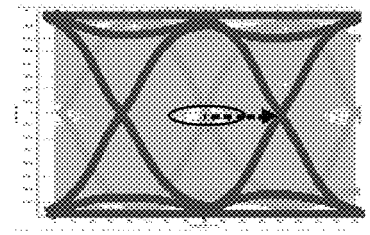
FIG. 2C Illustrates an attenuated received eye diagram after a low-pass channel, with local transmit transition timing shifted away from the received eye opening.

Referring to the FIG. 1 simultaneous bidirectional link 100, there are two signals whose phase alignments are important, the conventional CDR and conventional circuit combinations arrangement circuit provide only one degree of freedom in phase selection. As will be appreciated and understood from reading this disclosure, implementations and aspects of disclosed methods and systems can provide two degrees of freedom. One is the control of timing between sampling clock phase and received signal. The second is shifting the transmit transitions of the local transmitted signal away from the received signal optimum sampling time selected by the CDR. This condition is shown in FIG. 2C, where the earlier transmit transitions (occurring at middle of the receive eye) are shifted by half a symbol time to have the maximum distance from the received center eye. In an aspect, the additional timing control can be configured to shift the fastest transmit slew rate region (around transmit zero crossings) in between two consecutive optimum receive sampling points. Such relative phase adjustment, as shown in FIG. 2C, can align the lowest slew rate portion of the transmit signal with the receiver optimum sampling point, thus minimizes the transmit cancellation error.

Figure 3:
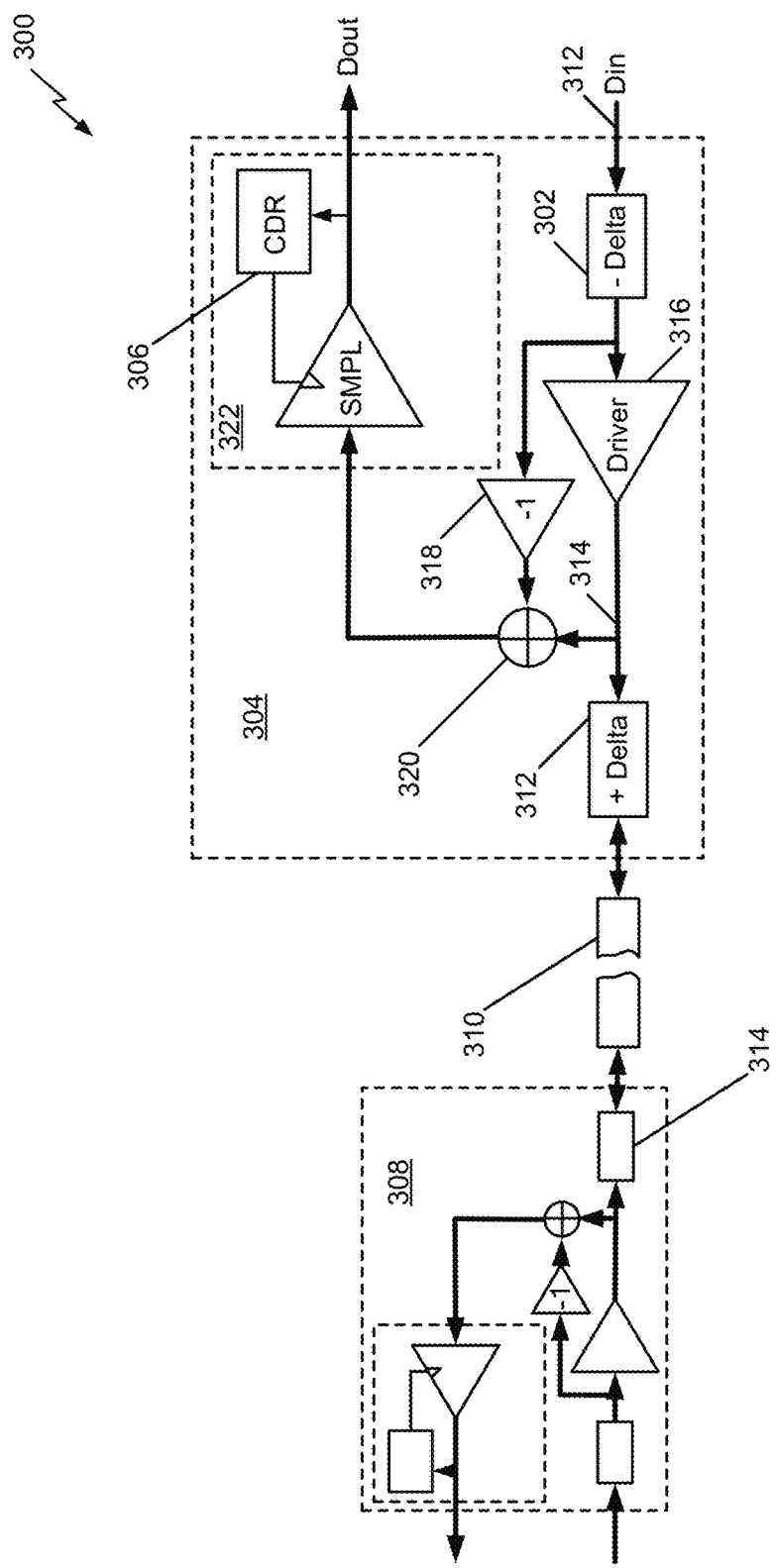
FIG. 3 Illustrates one example implementation of a phase optimizing simultaneous bidirectional link according to various aspects.

FIG. 3 shows an implementation of an example simultaneous bidirectional link 300 according to various aspects. Referring to FIG. 3 a delay unit 302, which will be referred to as a "relative delay" unit 302 is arranged in a first bidirectional transceiver 304 that, when controlled as will be described, sets the relative delay between the local transmit transitions and the optimal receiver sampling phase. By providing this new degree of freedom between the local transmit and receive timing, the relative delay unit 302 can shift local transmit transitions away from optimal receiver sampling phase as determined by a timing or clock recovery unit 306. Referring to FIG. 3, there can be a second or remote bidirectional transceiver 308 on the other side of the bidirectional channel 310. In an implementation, as illustrated in FIG. 3, the configuration and components of the remote bidirectional transceiver 308 can be identical to those of the first bidirectional transceiver 304. Accordingly, to avoid obscuring relevant details in FIG. 3, explicit labeling and numbering of items in the remote bidirectional transceiver 308 is omitted. Each of the items is implicitly numbered and labeled identical to the corresponding item of the first bidirectional transceiver 304.

The same mechanism as described above in reference to the relative delay unit 302 can exist in a second, or remote bidirectional transceiver 308 on the other side of the bidirectional channel 310 in order to address the same timing adjustment between its own transmit signal and the received signal from the first bidirectional transceiver 304. However, the transmit timing adjustment in the first bidirectional transceiver 304 on one side of the bidirectional channel 310 leads to a timing change for the received signal by the remote bidirectional transceiver 308 at the other side of the bidirectional channel 310. As a result, the remote bidirectional transceiver 308 needs to shift its optimal receiver sampling phase to track the timing change of the signal received from the bidirectional channel, and additionally shift its transmit timing together with its receiver sampling phase to keep their relative timing the same, such that the transmit transitions at receiver continue to occur in between its receive sampling points. This transmit timing change by the remote bidirectional transceiver 308 leads to the same timing shift in the signal received by first bidirectional transceiver 304, thus negates the original optimum timing adjustment between transmit and received signal, which was set by relative delay unit 302. To address this problem, a timing shift (Delta), opposite in polarity but substantially equal in magnitude to that of the relative delay unit 302, can be added to the bidirectional channel 310. This can be accomplished by arranging a bidirectional delay unit 312 in the first bidirectional transceiver 304, as shown in FIG. 3. Together with the relative delay unit 302, the bidirectional delay unit 312 can provide the required relative delay adjustment between local transmit and received signal, while keeping the net delay change of the transmitted signal into bidirectional channel substantially the same. In this scheme, the effective relative delay change between the transmit and receive timing is the sum of the delay magnitude changes (Delta) applied by the relative delay unit 302 and the new bidirectional delay unit 312. Since in a normal operation, the delay change (Delta) in the two delay units (relative delay unit 302 and bidirectional delay unit 312) need to have substantially the same magnitude, the effective relative delay change between transmit and received signals at receiver sampling point is the sum of the delay change of each of the delay units (i.e., 2×Delta). While one bi-directional delay unit is sufficient to address the timing conflict between the transceivers on two sides of the bi-directional channel, the remote bidirectional transceiver 308 can include a similar bi-directional delay unit 314 to provide wider delay adjustment for the link.

Figure 4:
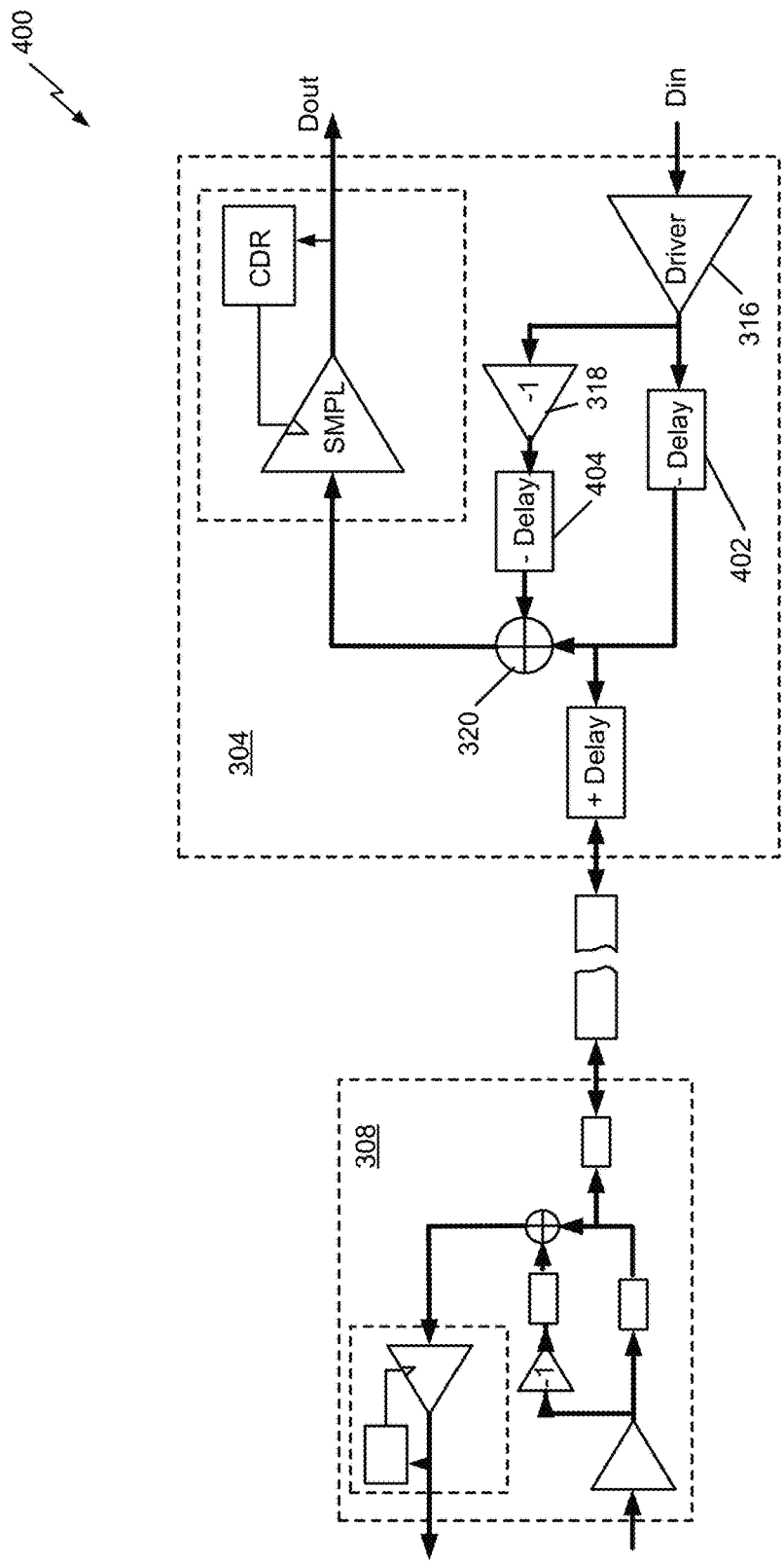
FIG. 4 Illustrates one example alternative implementation of a phase optimizing simultaneous bidirectional link according to various aspects.
Figure 5:
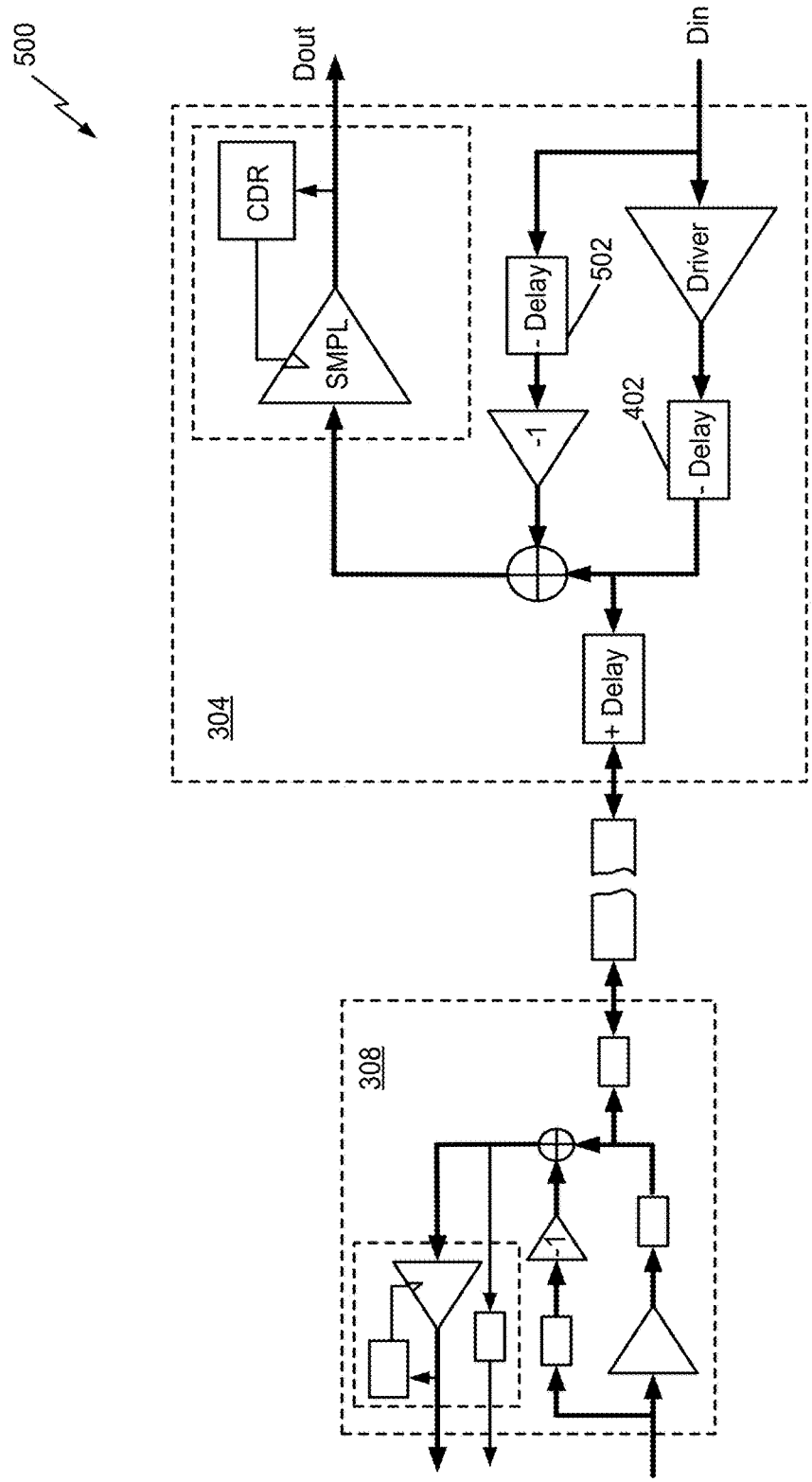
FIG. 5 Illustrates one example of another alternative implementation of a phase optimizing simultaneous bidirectional link according to various aspects.
Figure 6:
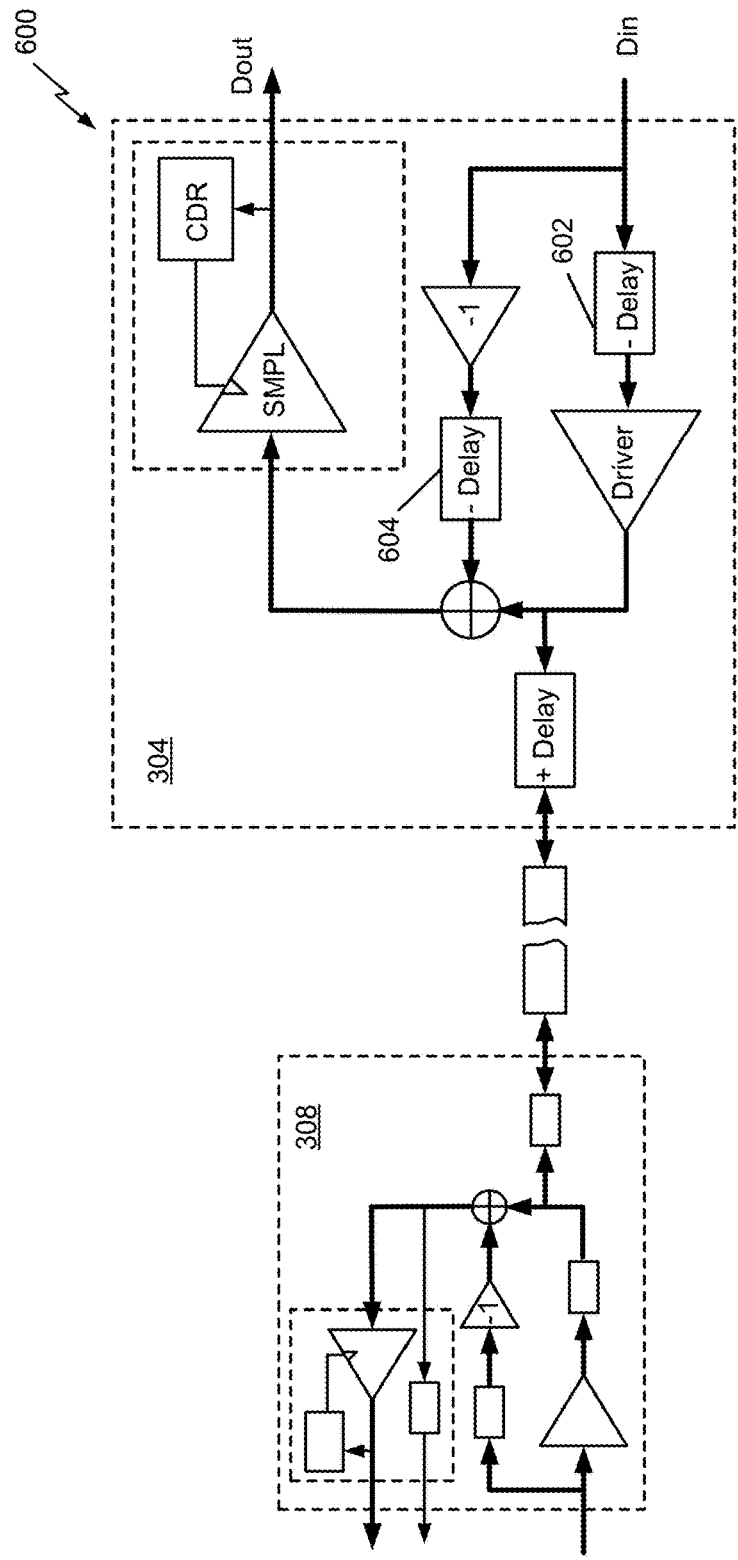
FIG. 6 Illustrates one example of another alternative implementation of a phase optimizing simultaneous bidirectional link according to various aspects.

Referring to FIG. 3, the relative delay unit 302 is shown arranged preceding the transmitter 316 and transmit replica unit 318. This arrangement can provide alignment of the output of the transmitter 316 to the output of the transmitter replica unit 318 feeding the canceller unit 310. However, as will be shown in reference to FIG. 4, the relative delay unit can serve the same function if it is replaced by one duplicate placed after the transmitter 316 and another duplicate after transmit replica unit 318, as long as it does not affect the receive signal. FIG. 4 shows an example where the relative delay is applied after transmitter 316 and transmit replica unit 318, by use of a first relative delay unit 402 at the output of the transmitter 316, and a second relative delay unit 404 after the transmit replica unit 318, but before the canceller unit 320 in the path to the receiver 322. Another permutation of the same architecture is shown in FIG. 5, where the relative delay is still applied after the transmitter 316 by the first relative delay unit 402, but is applied preceding the transmit replica unit 318 using relative delay unit 502. Another permutation of the same architecture is shown in FIG. 6, where the relative delay is applied preceding the transmitter 316 by the first relative delay unit 602, but is applied after the transmit replica unit 318 using relative delay unit 604.

Referring to FIG. 3, for purposes of description, a channel coupling the output of the transmitter 316 to one end of the bidirectional delay unit 312 and to an input of the canceller unit 320 can be termed a "local signal channel" (visible, but not separately numbered in the figures). Also for purposes of description, the transmit replica unit 318 and the canceller unit 320 can be collectively referenced as a "cancellation circuit" (visible, but not separately numbered in the figures). The cancellation circuit, as can be understood from description herein of operation of its components, can be configured to generate a replica of the delayed driver signal, (e.g., the output of the transmitter 316 in the FIG. 3 example) and to receive a signal from the local signal channel, and further configured to generate a receiver input signal (to the receiver 322) based on subtracting the replica of the delayed driver signal (from the transmit replica unit 318) from the signal received from the local signal channel.

Figure 7:
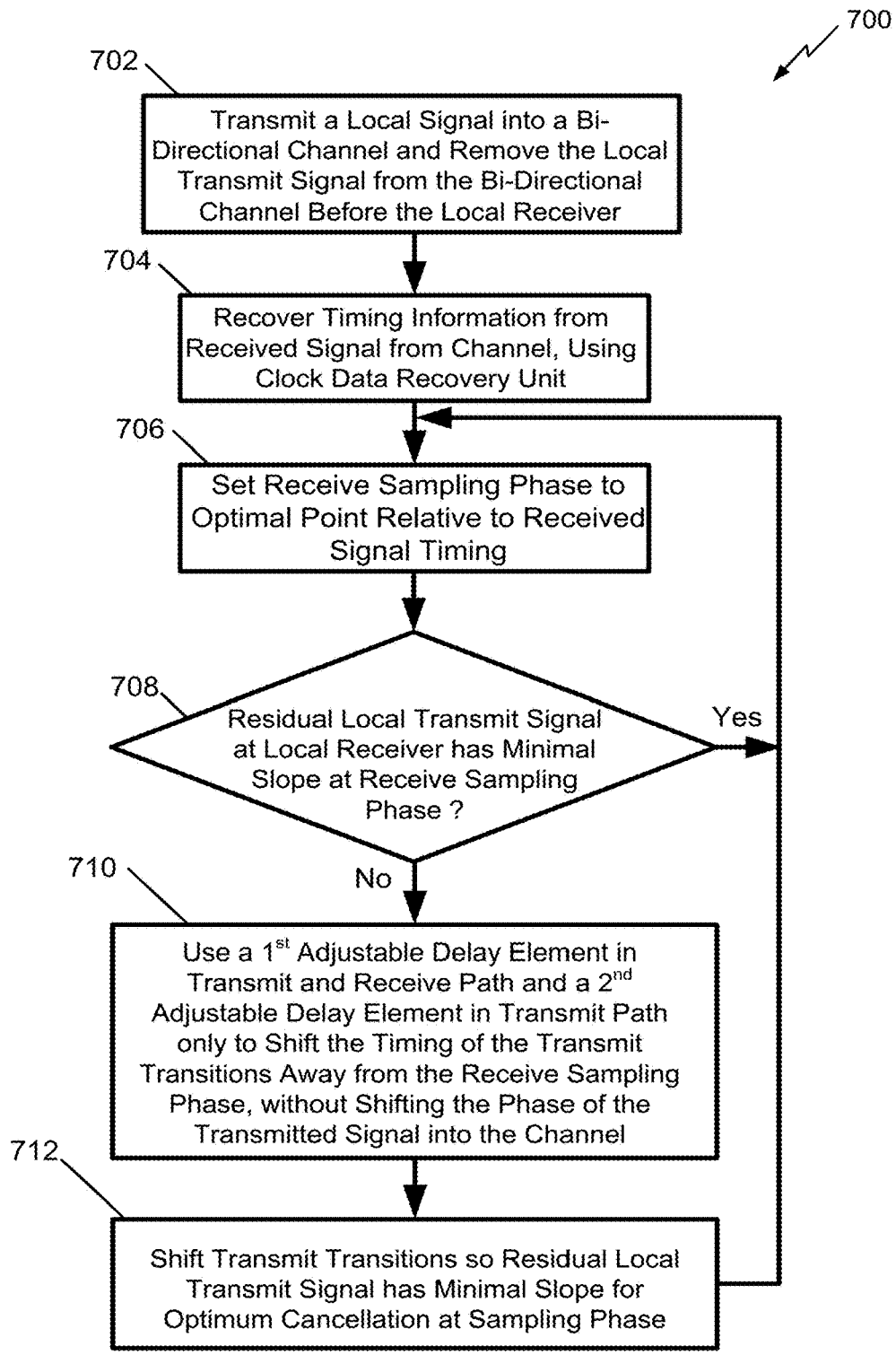
FIG. 7 is a flow diagram of operations to adjust delay elements in an implementation of a phase optimizing simultaneous bidirectional link according to various aspects, to optimize sampling points in accordance with disclosed concepts and aspects thereof.

FIG. 7 illustrates an example flow 700 of operations in a method of timing adjustment between local transmitter transition and receiver sampling for best transmit signal cancellation at receive optimal sampling phase in a simultaneous bidirectional link, using system of FIG. 3. Persons of ordinary skill, upon reading this disclosure, can readily apply the flow 700 to equivalent operations using either the FIG. 4, FIG. 5, or FIG. 6 system. Referring to FIG. 3, at step 702 transceiver 304 starts transmission of a local signal into the bi-directional channel 310, and the cancellation circuit operates to remove that local transmit signal before being received by the receiver. At steps 704 and 706, transceiver 304 receives the signal from the channel 310 and receiver 322, using CDR unit 306, recovers the best phase to sample the received signal. Once the best sampling point with regards to the received signal is identified, transceiver 304 internally determines if the residual local transmit signal has a minimal slope at the receiver sampling phase. If the answer is "yes," no action is taken and transceiver continues to track the receive signal phase. Otherwise, at step 710, transceiver 304 uses relative delay unit 302 and bidirectional delay unit 312 to shift the timing of the transmit transitions away from the sampling phase at the receiver 322, but without shifting the phase of the transmitted signal into channel 310. The relative timing between transmit and receive is selected, at step 712, such that the residual local transmit signal has a minimal slope at the receive sampling phase. As a result, after the adder or canceller unit 320, receiver sampling occurs at a most stable portion of the local transmit signal with minimal slope, or effectively at the middle of the transmit eye. As discussed earlier, at this point the transmit signal cancellation can be performed most accurately and optimally.

It can be noted by persons of ordinary skill, upon reading this disclosure that, for a known channel with a constant delay, the optimum relative delay setting between transmit and receive timing of a bidirectional transceiver can be identified a priori and hard-coded in the relative delay unit and the bidirectional delay unit in advance. Additionally, in certain implementations that the delay of the bi-directional channel itself can be controlled or its delay can be properly set in advance by design for a target signaling scheme, the bidirectional delay unit can be eliminated from the transceiver.

While this invention has been particularly shown and described with references to preferred embodiments thereof, it will be understood by those skilled in the art that various changes in form and details may be made therein without departing from the scope of the invention encompassed by the appended claims.

What is claimed is:

1. A bi-directional transceiver circuit, comprising:
   a local signal channel, configured to interface to an external bi-direction channel medium;
   a settable delay driver circuit, configured to receive a data-in signal and to drive into the local signal channel a delayed driver signal, delayed relative to the data-in signal by a time shift, wherein said delay driver circuit is further configured to receive a delay control signal and to set the time shift in accordance with the delay control signal;
   a cancellation circuit, configured to generate a replica of the delayed driver signal, and to receive a signal from the local signal channel, and further configured to generate a receiver input signal based on subtracting the replica of the delayed driver signal from the signal received from the local signal channel;
   a sampler, configured to sample the receiver input signal, at a sampling phase;
   a sampling phase controller, configured to adjust the sampling phase, based on the receiver input signal; and
   a local transmit phase controller, configured to generate the delay control signal based on a timing of transitions in the delayed driver signal relative to the sampling phase, and to adjust the delay control signal to maintain a given optimal phase difference between the timing of transitions in the delayed driver signal and the sampling phase.

2. The bi-directional transceiver circuit of claim 1, wherein the given optimal phase difference is where the delayed driver signal is maximally canceled at the sampling phase.

3. A bi-directional transceiver circuit, comprising:
   a local signal channel, configured to interface to an external bi-direction channel medium;
   a settable delay driver circuit, configured to receive a data-in signal, and to drive into the local signal channel a delayed driver signal, delayed relative to the data-in signal by a first time shift, said settable delay driver circuit is-further configured to change the first time shift by an amount Delta corresponding to the delay control signal;
   a cancellation circuit, configured to generate a replica of the delayed driver signal, and to receive a signal from the local signal channel, and further configured to generate a receiver input signal based on subtracting the replica of the delayed driver signal from the signal received from the local signal channel;

a sampler, configured to sample the receiver input signal, at a sampling phase;

a sampling phase controller, configured to adjust the sampling phase, based on the receiver input signal; and a bi-directional delay element, configured to provide a bi-directional path, having a second time shift, between the external channel medium and the local signal channel, the second time shift in the bi-directional path being the same or substantially the same magnitude as a magnitude of the first time shift but opposite polarity to the first time shift.

4. The bi-directional transceiver circuit of claim 3, further comprising:

a local transmit phase controller, configured to generate a delay control signal based on a timing of transitions in the delayed driver signal relative to the sampling phase, wherein the settable delay driver circuit is further configured to receive the delay control signal, and to set the first time shift in accordance with the delay control signal, and the bi-directional delay element is adjustable and configured to receive the delay control signal and, in response, to change the second time shift in the bi-directional path by the Delta or substantially the same amount as the Delta but opposite polarity to the first time shift.

5. The bi-directional transceiver circuit of claim 4, wherein:

the settable delay driver circuit includes a driver, having a driver input and a driver output, and includes an adjustable delay element, the adjusting delay element configured to provide a path having the first time shift, from the data input to the driver input, and to receive the delay control signal, and in response, to change the first time shift by the Delta, the cancellation circuit includes an inverter and an adder, the inverter having an input coupled to the input of the driver, and having an inverter output, the adder having a first adder input configured to receive signals from the local signal channel, a second adder input configured to receive an output signal from the inverter, and an adder output configured to output from the adder output, as the receiver input signal, a sum of the received signals from the local signal channel and the output signal from the inverter.

6. The bi-directional transceiver circuit of claim 4, wherein:

the adjustable delay driver circuit includes a driver and a first adjustable delay element, the driver having a driver input and a driver output, the driver input being coupled to the data-in terminal, the first adjustable delay element being configured to provide a first path, having the first time shift, from the driver output to the local signal channel, and further configured to receive the delay control signal, and in response, to change the first time shift in the first path by the Delta, the cancellation circuit includes an inverter, a second adjustable delay element, and an adder, the adder having an adder first input configured to receive signals from the local signal channel, an adder second input, and an adder output, the inverter having an inverter input and an inverter output, the second adjustable circuit being configured to provide a second path, having a time shift equal to or substantially equal to the first time shift, from the inverter output to the adder second input, and further configured to receive the delay control signal, and in response, to change the time shift in the second path by the Delta or approximately the Delta, and the adder is configured to output from the adder output, as the sampler input signal, a sum of the received signals from the local signal channel and the output of the second adjustable delay element.

7. The bi-directional transceiver circuit of claim 4, wherein:

the adjustable delay driver circuit includes a driver and a first adjustable delay element, the driver having a driver input and a driver output, the driver input being coupled to the data-in terminal, the first adjustable delay element being configured to provide a first path, having the first time shift, from the driver output to the local signal channel, and further configured to receive the delay control signal, and in response, to change the first time shift in the first path by the Delta, the cancellation circuit includes an inverter, a second adjustable delay element, and an adder, the adder having an adder first input configured to receive signals from the local signal channel, an adder second input, and an adder output, the inverter having an inverter output coupled to the adder second input, and an inverter input, the second adjustable delay element being configured to provide a second path, having a time shift equal to or substantially equal to the first time shift, from the data-in terminal to the inverter input, and further configured to receive the delay control signal, and in response, to change the time shift in the second path by the Delta or approximately the Delta, and the adder is configured to output from the adder output, as the sampler input signal, a sum of the received signals from the local signal channel and an output from the inverter output.

8. The bi-directional transceiver circuit of claim 4, wherein the bi-directional adjustable delay element is further configured to:

provide the bi-directional path, having the second time shift, between an external wireless channel medium and local signal channel, receive the delayed driver signal from the local signal channel, and transmit into the external wireless channel medium a corresponding wireless transmit signal, delayed by the second time shift relative to the delayed driver signal, and receive a wireless signal from the external wireless channel medium and deliver, into the local signal channel in superposition with the delayed driver signal, a corresponding delayed received signal, delayed by the second time shift relative to the received wireless signal.

9. The bi-directional transceiver circuit of claim 4, wherein the bi-directional adjustable delay element is further configured to:

provide the bi-directional path, having the second time shift, between an external wireline channel medium and local signal channel, receive the delayed driver signal from the local signal channel, and transmit into the external wireline channel medium a corresponding wireline transmit signal, delayed by the second time shift relative to the delayed driver signal, and receive a wireline signal from the external wireline channel medium and deliver, into the local signal channel in superposition with the delayed driver signal, a corresponding delayed received signal, delayed by the second time shift relative to the received wireless signal.

10. The bi-directional transceiver circuit of claim 4, wherein the bi-directional adjustable delay element is further configured to:
provide the bi-directional path, having the second time shift, between an external optical channel medium and local signal channel,
receive the delayed driver signal from the local signal channel, and transmit into the external optical channel medium a corresponding optical transmit signal, delayed by the second time shift relative to the delayed driver signal, and
receive an optical signal from the external optical channel medium and deliver, into the local signal channel in superposition with the delayed driver signal, a corresponding delayed received signal, delayed by the second time shift relative to the received optical signal.

11. A method comprising:
receiving a signal from a remote transceiver, over an external channel medium;
delaying, by a first time shift, the received signal from the external channel medium to generate a delayed received signal;
recovering timing information from the delayed received signal;
setting a sampling phase, based at least in part on the recovered timing information;
sampling the delayed received signal according to the sampling phase;
receiving a data-in signal;
delaying, by a second time shift, the data-in signal to generate a delayed local transmit signal, the delayed local transmit signal including transitions, at a delay relative to the data-in signal by a time shift amount that places the transitions at a given phase relative to the sampling phase;
delaying, by the first time shift, the delayed local transmit signal to generate a transmit signal; and
transmitting into the external channel medium the transmit signal.

12. The method of claim 11, further comprising:
generating a replica of the delayed local transmit signal;
canceling the delayed local transmits signal, wherein the canceling includes subtracting the replica of the delayed local transmit signal from the received signal to generate a receiver input signal, and wherein
sampling the receiver input signal.

13. The method of claim 12, wherein said delaying, by a second time shift, the data-in signal comprises:
detecting the phase of the transitions relative to the sampling phase; and
adjusting the time shift amount until the detected phase meets an optimal point.

14. The method of claim 13, wherein detecting the phase and adjusting the time shift amount is repeated at a frequency to ensure the detected phase continues to meet the optimal point.

15. The bi-directional transceiver circuit of claim 13, wherein the optimal point is where the delayed local transmit signal is maximally canceled at the sampling phase.

16. The method of claim 11, wherein the transmitting the transmit signal includes:
in response to a change in magnitude and polarity in the second time shift, changing a magnitude of the first time shift and changing a polarity of the first time shift to be opposite to the polarity of the second time shift.

* * * * *